(12) United States Patent
Lee (10) Patent No.: US 12,115,399 B2
(45) Date of Patent: Oct. 15, 2024

(54) DEVICE AND METHOD FOR EXTINGUISHING FIRE IN BATTERY PACK FOR SHIP PRELIMINARY CLASS

(71) Applicant: Seho Marine Solutions Co., Ltd., Ulsan (KR)

(72) Inventor: Sung Beom Lee, Ulsan (KR)

(73) Assignee: Seho Marine Solutions Co., Ltd., Ulsan (KR)

( * ) Notice: Subject to any disclaimer, the term of this patent is extended or adjusted under 35 U.S.C. 154(b) by 0 days.

(21) Appl. No.: 18/525,761

(22) Filed: Nov. 30, 2023

(65) Prior Publication Data

US 2024/0261609 A1    Aug. 8, 2024

(30) Foreign Application Priority Data

Feb. 7, 2023   (KR) .................. 10-2023-0016431

(51) Int. Cl.
*A62C 3/10*    (2006.01)
*A62C 3/16*    (2006.01)
*A62C 37/36*   (2006.01)

(52) U.S. Cl.
CPC .................. *A62C 3/10* (2013.01); *A62C 3/16* (2013.01); *A62C 37/04* (2013.01)

(58) Field of Classification Search
CPC .............. A62C 3/10; A62C 3/16; A62C 37/04
USPC ........................................................ 169/62
See application file for complete search history.

(56) References Cited

U.S. PATENT DOCUMENTS

| | | | |
|---|---|---|---|
| 2014/0102731 A1* | 4/2014 | Riegger | B63H 21/38 169/45 |
| 2020/0266508 A1* | 8/2020 | Hjorteset | H01M 10/63 |
| 2023/0318066 A1* | 10/2023 | Williams | H01M 10/425 429/53 |

FOREIGN PATENT DOCUMENTS

| | | |
|---|---|---|
| JP | 2000067840 | 3/2000 |
| KR | 1020190100064 | 8/2019 |
| KR | 1020210050894 | 5/2021 |
| KR | 102289714 | 8/2021 |
| KR | 1020220027937 | 3/2022 |
| KR | 1020220075032 | 6/2022 |

OTHER PUBLICATIONS

Request for the Submission of an Opinion dated Apr. 18, 2023, issued in Korean Patent Application No. 10-2023-0016431.
Written Decision on Registration dated Jul. 27, 2023, issued in Korean Patent Application No. 10-2023-0016431.

* cited by examiner

*Primary Examiner* — Cody J Lieuwen
(74) *Attorney, Agent, or Firm* — PnK IP LLC (57) ABSTRACT

Provided is a device for extinguishing a fire in a battery pack for a ship, the device including a battery room in which a plurality of battery packs are stored and which is provided with a battery storage unit, a fire detection unit that is provided with a fusible plug attachably disposed inside the battery room, detects an abnormal temperature inside the battery room, and transmits information, and a fire extinguishing unit that is provided close to the battery room outside the battery room and extinguishes a fire by supplying seawater when a fire detection line detects the fire.

5 Claims, 10 Drawing Sheets

DEVICE AND METHOD FOR EXTINGUISHING FIRE IN BATTERY PACK FOR SHIP PRELIMINARY CLASS

CROSS-REFERENCE TO RELATED APPLICATION

This application claims priority from and the benefit of Korean Patent Application No. 10-2023-0016431, filed on Feb. 7, 2023, which is hereby incorporated by reference for all purposes as if fully set forth herein.

BACKGROUND

Field

The present disclosure relates to a battery pack fire extinguishing device and method in an electric propulsion ship using a battery, and more particularly, to a battery pack fire extinguishing device and method in which, when fire occurs in a battery pack stored in a battery storage unit provided inside a battery room, the battery storage unit is flooded, and thus the fire is extinguished.

Discussion of the Background

When a fire occurs in a secondary battery, high heat of 1,000° C. or higher affects adjacent battery cells due to thermal runaway of the battery cells, a series of explosions are caused, and thus, it is difficult to extinguish the fire until the battery is completely burned out.

Further, the battery fire may equally occur in an electric propulsion ship and a hydrogen-electric propulsion ship equipped with a battery. When the battery fire occurs while the ship is in operation or while the battery is being charged or discharged, since it is difficult to effectively extinguish the battery fire using the conventional fire extinguishing method that does not consider characteristics of the battery fire, this leads to complete burning of the ship, and thus, passenger safety cannot be guaranteed.

The conventional disclosure, Korean Patent Application Publication No. 10-2022-0027937, proposes a fire extinguishing device for extinguishing a fire inside a battery pack such as a lithium-ion battery pack, in which the fire extinguishing device includes a liquid circuit and a thermal management system, a fusible portion is melted when exposed to a temperature higher than a predetermined operating temperature, and thus a liquid may be discharged to cool a portion of the battery pack when a temperature abnormally increases near an opening.

However, in this case, the amount of a fire extinguishing liquid is limited, and thus it is difficult to supply the fire extinguishing liquid when a ship is in operation, and only a portion of the battery pack is cooled; and consequently, it is difficult to completely extinguish thermal runaway of the battery pack.

Thus, there is a need for a device capable of completely extinguishing a fire and an abnormal temperature in the battery pack by quickly identifying a fire in the conventional lithium-ion battery and the conventional electric battery.

The above information disclosed in this Background section is only for understanding of the background of the inventive concepts, and, therefore, it may contain information that does not constitute prior art.

SUMMARY

In order to meet the above requirement, when the ship battery pack fire extinguishing device and method are provided, a fire in a battery room, which cannot be extinguished until the conventional ship is completely burned out, is extinguished by isolating the battery pack from the battery room to prevent a series of explosions, and as a result, the safety of passengers may be ensured.

Further, when the fire extinguishing method considering fire extinguishing of a ship is provided, the conventional fire extinguishing methods such as the powder extinguishing method that blocks oxygen at a fire site, the carbon dioxide extinguishing method, or the fire extinguishing method that sprays water directly on the fire site, are evaluated as being ineffective in extinguishing electric vehicle battery fires. A method of extinguishing a fire by completely submerging a burning battery extinguishes a burning battery more quickly than general fire extinguishing methods, thereby ensuring the safety and economic efficiency. Thus, the inventor developed such a device and method.

Thus, an aspect of the present disclosure is to solve all the above-described problems.

Further, another aspect of the present disclosure is to provide a ship battery pack fire extinguishing device and method in which a battery storage unit capable of isolating a battery pack is provided inside a battery room, and when a fire occurs, seawater is input into the battery storage unit, the battery pack is submerged, the fire is extinguished, therefore, a series of explosions of the battery pack and complete burning of a ship are prevented, and thus the safety of passengers may be ensured.

Further, still another aspect of the present disclosure is to provide a ship battery pack fire extinguishing device and method which is capable of ensuring the safety and economic efficiency by extinguishing a fire and resolving an abnormal temperature more quickly than a general fire extinguishing method that extinguishes a fire by blocking oxygen at a fire site and directly spraying water.

Additional features of the inventive concepts will be set forth in the description which follows, and in part will be apparent from the description, or may be learned by practice of the inventive concepts.

A device for extinguishing a fire in a battery pack for a ship includes a battery room (100) in which a plurality of battery packs (10) are stored and which is provided with a battery storage unit (110), a fire detection unit (200) that is provided with a fusible plug (210) attachably disposed inside the battery room (100) or an inside of the battery storage unit (110), detects an abnormal temperature inside the battery room (100) or inside the battery storage unit (110), and transmits information on the abnormal temperature, and a fire extinguishing unit (300) that is provided close to the battery room (100) outside the battery room (100) and configured to extinguish a fire by supplying seawater when the fire detection unit (200) detects the fire.

The battery room (100) may include the battery storage unit (110) provided inside the battery room (100) to surround the battery pack (10), an overflow discharge line (120) which is provided on one side of the battery storage unit (110), of which one end is connected to the battery storage unit (110) and the other end is connected to an outside of a ship, and which opens a valve when the battery storage unit (110) is submerged to discharge inside seawater to an outside, and a seawater inflow line (130) of which one end passes through the battery room (100) and is connected to a seawater inlet (114) of the battery storage unit (110) and the other end is connected to a seawater supply line (320) of the fire extinguishing unit (300) and which causes the seawater to flow into the battery storage unit (110) to submerge the battery storage unit (110).

The battery storage unit (110) may further include a pressure measuring unit (111) that measures a pressure of the battery storage unit (110), a temperature measuring unit (112) that measures a temperature of the battery storage unit (110), an outlet (113) through which remaining seawater in the battery storage unit (110) is discharged, the seawater inlet (114) which is provided to pass through a side surface of the battery room (100) and connected to the seawater inflow line (130) and through which the seawater is introduced, and a seawater outlet (115) which is connected to the overflow discharge line (120) and through which the seawater is discharged to the outside of the ship.

The fire detection unit (200) may include the fusible plug (210) attachably disposed inside the battery storage unit (110) and having a portion to be melted to lose a pressure inside a detection line (250) when a temperature of the battery storage unit (110) is greater than or equal to a threshold, a pressure valve (220) connected to a predetermined position of the detection line (250), provided in the seawater supply line (320) in a closed state, and opened due to pressure loss when the fusible plug (210) is damaged so that the seawater is introduced, an alarm (230) that is provided at a distal end of the detection line (250) and generates noise when the pressure inside the detection line (250) is lost, a thermal imaging camera (240) that is positioned inside the battery room (100) and identifies a situation inside the battery room (100) through an image, and the detection line (250) provided in a pipe shape of which one end is attached to the fusible plug (210) and the other end is connected to the alarm (230) and provided with a compressed interior.

The fusible plug (210) may be replaced with a bimetal that is bent and loses a pressure inside the detection line (250) when a temperature thereof is greater than a set threshold temperature, a platinum filament that detects a gas using heat generated due to oxidation when in contact with a flammable gas and loses pressure inside the detection line (250), and a photoelectric spot detector that loses the pressure inside the detection line (250) when smoke having a certain concentration is detected using a blocking rate and a refractive index of light according to smoke particles.

The fire extinguishing unit may include a sea chest (310) positioned adjacent to the battery room (100) and having the seawater supply line (320) on one side thereof, the seawater supply line (320) that has one end passing through one surface of the sea chest (310) and the other end passing through an inside of the battery room (100) or one surface of the battery room (100) and supplies the seawater from the sea chest (310) to the battery storage unit (110), a seawater pump (330) that is provided at a predetermined position of the seawater supply line (320) and moves the seawater from the sea chest (310) to the seawater supply line (320), and a remote control valve (340) provided at a predetermined position of the seawater supply line (320) and opened to move the seawater to the battery storage unit (110) when a fire occurs.

The device may further include a controller (400) that allows a manager to control opening and closing of a valve connected to the battery storage unit (110) and input of the seawater by receiving information on a temperature and a pressure of the battery storage unit (110), an alarm transmitted from the fire detection unit (200) when a pressure inside the detection line (250) decreases, and information on an image inside the battery room (100).

A method of extinguishing a fire in a battery pack for a ship includes causing a temperature inside a battery storage unit to be greater than a threshold temperature (S10), melting a portion of a fusible plug provided inside the battery storage unit (S20), opening a pressure valve due to a pressure loss in a detection line (S30), submerging the battery storage unit by supplying seawater to the battery storage unit (S40), discharging the seawater supplied into the battery storage unit to an outside of a ship (S50), and supplying, discharging, and circulating the seawater inside a battery room (S60).

The method may further include, between the opening of the pressure valve of the seawater supply line due to the pressure loss inside the detection line (S30) and the submerging of the battery storage unit by supplying the seawater to the battery storage unit (S40), alarming a manager about a pressure loss in the detection line (S21), determining, by the manager, whether the battery storage unit has an abnormal temperature or whether a fire occurs, by identifying a temperature and thermal imaging information inside the battery storage unit (S22), and opening, by the manager, a remote control valve provided in the seawater supply line (S23).

A device for extinguishing a fire in a battery pack for a ship includes a battery room (100) in which a plurality of battery packs (10) are stored and which is provided with a battery storage unit (110), a fire detection unit (200) that is provided with a fusible plug (210) attachably disposed inside the battery room (100), detects an abnormal temperature inside the battery room (100), and transmit information on the abnormal temperature, and a fire extinguishing unit (300) that is provided close to the battery room (100) outside the battery room (100) and extinguishes a fire by supplying seawater when the fire detection line (200) detects the fire.

The battery room (100) may include the battery storage unit (110) provided inside the battery room (100) to surround the battery pack (10), an overflow discharge line (120) which is provided on one side of the battery storage unit (110), of which one end is connected to the battery storage unit (110) and the other end is connected to an outside of a ship, and which opens a valve when the battery storage unit (110) is submerged to discharge inside seawater to an outside, and a seawater inflow line (130) of which one end passes through the battery room (100) and is connected to a seawater inlet (114) of the battery storage unit (110) and the other end is connected to a seawater supply line (320) of the fire extinguishing unit (300) and which causes the seawater to flow into the battery storage unit (110) to submerge the battery room (100).

The battery storage unit (110) may further include an outlet (113) through which remaining seawater of the battery storage unit (110) is discharged, the seawater inlet (114) which is provided to pass through a side surface of the battery room (100) and connected to the seawater inflow line (130) and through which the seawater is introduced, and a seawater outlet (115) which is connected to the overflow discharge line (120) and through which the seawater is discharged to the outside of the ship.

The fire detection unit (200) may include the fusible plug (210) attachably disposed inside the battery room (100) and having a portion to be melted to lose a pressure inside a detection line (250) when a temperature of the battery room (100) is greater than or equal to a threshold, a pressure valve (220) connected to a predetermined position of the detection line (250), provided in the seawater supply line (320) in a closed state, and opened due to pressure loss when the fusible plug (210) is damaged so that the seawater is introduced, an alarm (230) that is provided at a distal end of the detection line (250) and generates noise when the pressure inside the detection line (250) is lost, a thermal imaging camera (240) that is positioned inside the battery room (100) and identifies a situation inside the battery room (100) through an image, and the detection line (250) provided in a pipe shape of which one end is attached to the fusible plug (210) and the other end is connected to the alarm (230) and provided with a compressed interior.

The fire extinguishing unit may include a sea chest (310) positioned adjacent to the battery room (100) and having the seawater supply line (320) on one side thereof, the seawater supply line (320) that has one end passing through one surface of the sea chest (310) and the other end passing through an inside of the battery room (100) or one surface of the battery room (100) and supplies the seawater from the sea chest (310) to the battery storage unit (110), a seawater pump (330) that is provided at a predetermined position of the seawater supply line (320) and moves the seawater from the sea chest (310) to the seawater supply line (320), and a remote control valve (340) provided at a predetermined position of the seawater supply line (320) and opened to move the seawater to the battery storage unit (110) when a fire occurs.

The device may further include a controller (400) that allows a manager to control opening and closing of a valve connected to the battery storage unit (110) and input of the seawater by receiving information on a temperature and a pressure of the battery storage unit (110), an alarm transmitted from the fire detection unit (200) when a pressure inside the detection line (250) decreases, and information on an image inside the battery room (100).

A method of extinguishing a fire in a battery pack for a ship includes causing a temperature inside a battery storage unit to be greater than a threshold temperature (S10), melting a portion of a fusible plug provided inside the battery storage unit (S20), opening a pressure valve due to a pressure loss in a detection line (S30), submerging the battery storage unit by supplying seawater to the battery storage unit (S40), discharging the seawater supplied into the battery storage unit to an outside of a ship (S50), and supplying, discharging, and circulating the seawater inside a battery room (S60).

The method may further include, between the opening of the pressure valve of the seawater supply line due to the pressure loss inside the detection line (S30) and the submerging of the battery storage unit by supplying the seawater to the battery storage unit (S40), alarming a manager about a pressure loss in the detection line (S21), determining, by the manager, whether the battery storage unit has an abnormal temperature or whether a fire occurs, by identifying a temperature and thermal imaging information inside the battery storage unit (S22), and opening, by the manager, a remote control valve provided in the seawater supply line (S23).

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts

DETAILED DESCRIPTION

The detailed description of the present disclosure, which will be made below, refers to the accompanying drawings illustrating, as an example, specific embodiments in which the present disclosure may be implemented. These embodiments are described in detail so that those skilled in the art can sufficiently implement the present disclosure. It should be understood that various embodiments of the present disclosure are different from each other but are not necessarily mutually exclusive. For example, specific shapes, structures, and characteristics described herein in relation to the embodiment may be implemented in other embodiments without departing from the spirit and scope of the present disclosure. Further, it should be understood that a position or arrangement of an individual component in each disclosed embodiment may be changed without departing from the spirit and scope of the present disclosure. Thus, the following detailed description is not intended to be taken in a limiting sense, and the scope of the present disclosure is limited only by the appended claims in addition to all equivalents to which the claims assert, when properly described. In the drawings, similar reference numerals refer to the same or similar functions across various aspects.

Hereinafter, in order to enable those skilled in the art to which the present disclosure belongs to easily implement the present disclosure, embodiments of the present disclosure will be described in detail with reference to the accompanying drawings.

Figure 1:
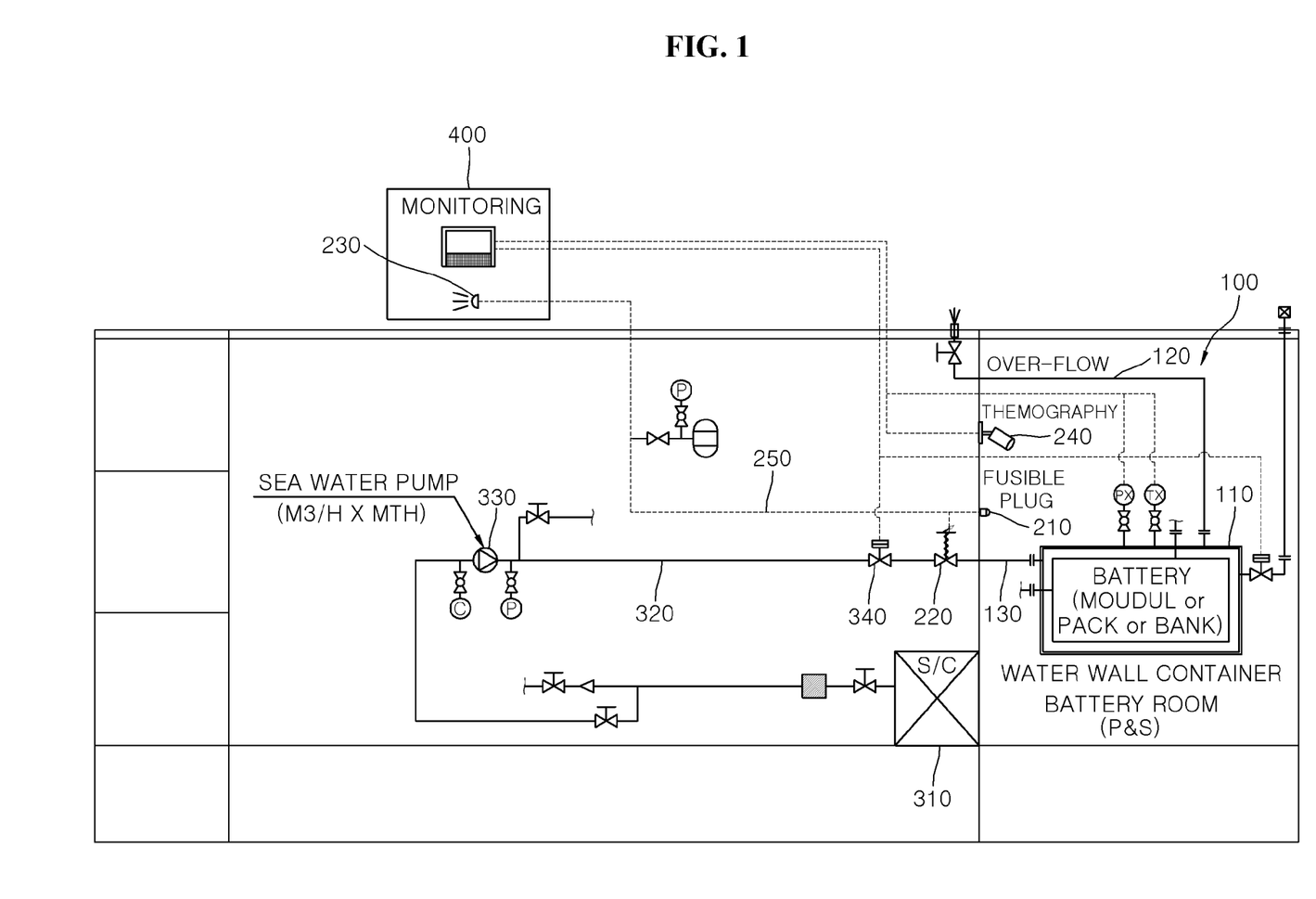
FIG. 1 is a diagram illustrating, with symbols, an overall configuration of a battery pack fire extinguishing device of a battery pack provided with a battery storage unit in the form of surrounding the battery pack according to an embodiment of the present disclosure.

FIG. 1 is a diagram illustrating, with symbols, an overall configuration of a battery pack fire extinguishing device of a battery pack provided with a battery storage unit in the form of surrounding the battery pack according to an embodiment of the present disclosure. Referring to FIG. 1, the battery pack fire extinguishing device includes a battery room 100 in which a plurality of battery packs may be stored and which is provided with a battery storage unit 110, a fire detection unit 200 that detects occurrence of a fire inside the battery storage unit 110 and transmits information, a fire extinguishing unit 300 that is provided close to the battery room 100 outside the battery room 100 and extinguishes the fire by supplying seawater when the fire detection unit 200 detects the fire, and a controller 400 that may identify information transmitted from the battery room 100, the fire detection unit 200, and the fire extinguishing unit 300 and control opening or closing of a valve and input of the seawater.

Figure 2:
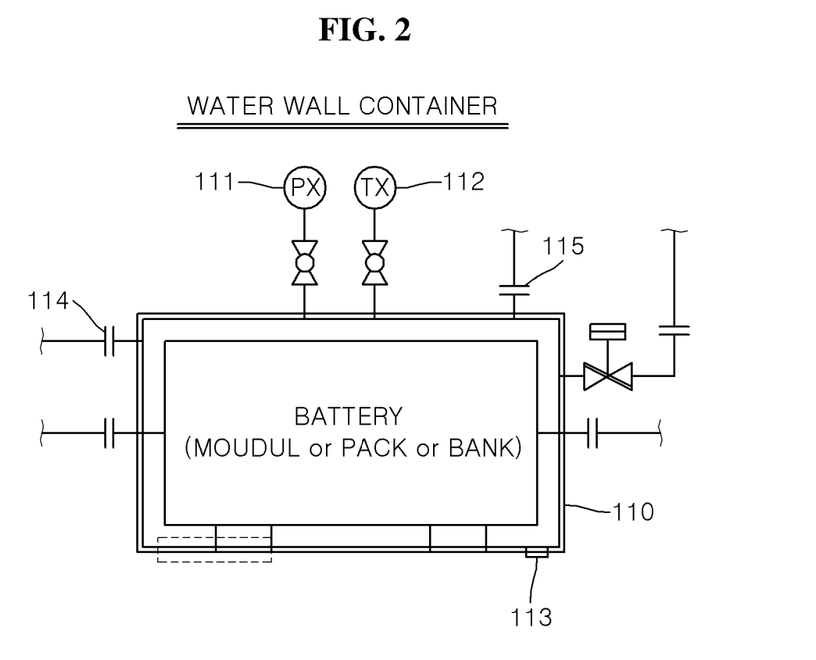
FIG. 2 is a diagram illustrating, in detail, a configuration of the battery storage unit surrounding the battery pack according to the embodiment of the present disclosure.

The battery room 100 is provided with a battery storage unit 110 that surrounds a battery pack 10 inside the battery room 100 and isolates the battery pack 10, and includes an overflow discharge line 120 and a seawater inflow line 130 provided on one side of the battery storage unit 110.

One end of the overflow discharge line 120 is connected to a seawater outlet 115 of the battery storage unit 110 and the other end thereof is connected to the outside of a ship so that the seawater thereinside may be discharged when the battery storage unit 110 is submerged.

One end of the seawater inflow line 130 may pass through the battery room 100 and may be connected to a seawater inlet 114 of the battery storage unit 110, and the other end thereof may be connected to the seawater supply line 320 of the fire extinguishing unit 300. The seawater may flow thereinto and submerge the battery storage unit 110. After the fire is extinguished and an abnormal temperature is resolved through the submerging, the remaining water that is not discharged through the overflow discharge line 120 may be discharged through a drainage hole 113 provided at a lower portion of the battery storage unit 110.

Further, a pressure measuring unit 111 and a temperature measuring unit 112 of the battery storage unit 110 that surrounds the battery pack 10 are provided at one end of one side of the battery storage unit 110 and the other end thereof is connected to the controller 400 so that an abnormal pressure and an abnormal temperature that may be identified when the fire occurs in the battery pack 10 can be remotely identified through the controller 400.

The fire detection unit 200 may be provided with a fusible plug 210 attachably disposed inside the battery storage unit 110, an alarm 230 that may be provided in the controller 400, and a detection line 250 that connects the fusible plug 210 and the alarm 230, the fusible plug 210, the alarm 230, and the detection line 250 being provided in the form of a pipe, and may include a pressure valve 220 provided in the detection line 250 in a closed state and a thermal imaging camera 240 having one end attachably disposed inside the battery room 100 and the other end connected to the controller 400. The fusible plug 210 may be made of a partially fusible synthetic resin material.

When a temperature inside the battery storage unit 110 is greater than a threshold temperature, a portion of the fusible plug 210 is melted, and thus a pressure inside the detection line 250 is lost. When the pressure inside the detection line 250 is lost, the pressure valve 220 provided in a closed state is opened, and at the same time, an abnormal temperature of the battery room 100 is detected, and thus the alarm 230 of the controller 400 is transmitted to a manager. The manager who receives the alarm can identify a state inside the battery storage unit 110 through the thermal imaging camera 240, the pressure measuring unit 111, and the temperature measuring unit 112 and determine an abnormal temperature and a fire situation.

The fire extinguishing unit 300 is provided with a sea chest 310 having a seawater supply line on one side thereof, a seawater supply line 320, a seawater pump 330, and a remote control valve 340. The sea chest 310 may be positioned adjacent to the battery room 100 and provided with the seawater supply line 320 on one side thereof. The seawater supply line 320 has a pipe shape of which one end passes through one surface of the sea chest 310 and the other end is provided inside the battery room 100 and may deliver the seawater from the sea chest 310 to the battery storage unit 110 when the fire and the abnormal temperature occur. The seawater pump 330 may be provided at a predetermined position of the seawater supply line 320 and move the seawater from the sea chest 310 to the seawater supply line 320 when the fire occurs.

Further, the remote valve 340 may be provided at a predetermined position of the seawater supply line 320, may be connected to the controller 400 so that the manager is alerted of the fire and the abnormal temperature through the controller 400, and may perform a process of opening the remote valve 340 and delivering the seawater via the seawater inflow line 130 through the seawater inlet 114 to the battery storage unit 110.

After recognizing the fire and the abnormal temperature using the thermal imaging camera 240, finally, the manager may open the remote control valve 340 to move the seawater from the sea chest 310 using the seawater pump 330 and thus can extinguish the fire by supplying the seawater to the battery storage unit 110 through the seawater inlet 114 inside the battery storage unit 110 via the seawater inflow line 130 of the battery room 100.

Thereafter, when the fire is extinguished, the remote control valve 340 may be closed to block the supply of the seawater to the battery storage unit 110, and the seawater may be discharged to the outside of the ship through the overflow discharge line 120.

Figure 3:
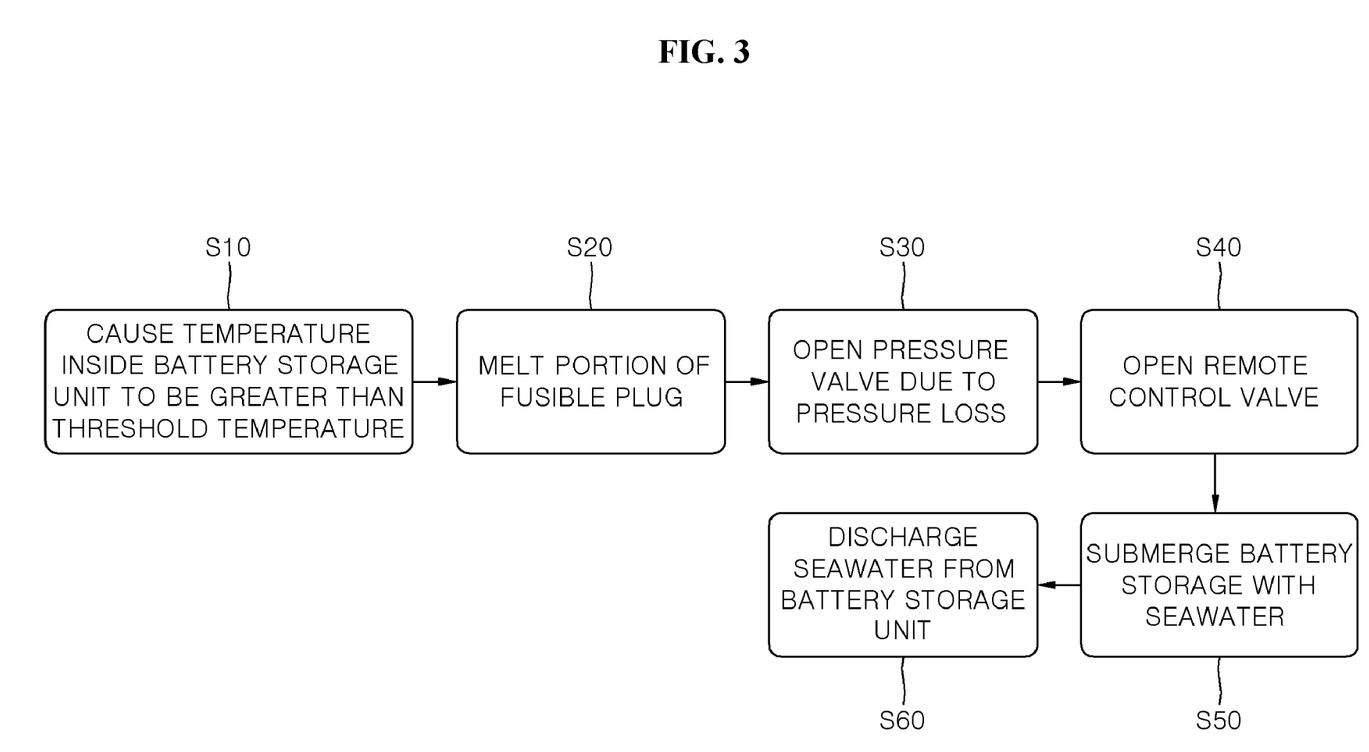
FIG. 3 is a flowchart illustrating a battery pack fire extinguishing method of the battery pack provided with the battery storage unit that surrounds the battery pack according to the embodiment of the present disclosure.

FIG. 3 is a flowchart illustrating a process of a battery pack fire extinguishing method of the battery pack provided with the battery storage unit that surrounds the battery pack according to the embodiment of the present disclosure.

Referring to FIG. 3, when a temperature inside the battery storage unit 110 is greater than a threshold temperature, a portion of the fusible plug 210 is melted (S20). As the portion of the fusible plug 210 is melted, the pressure inside the detection line 250 is lost, the pressure valve 220 connected to the detection line 250 and the seawater supply line 320 is opened (S30). The pressure valve 220 is opened, the seawater is supplied from the seawater inlet 114 to the battery storage unit 110, the battery storage unit 110 is submerged, and thus the fire is extinguished and the abnormal temperature is resolved (S40). When the fire is extinguished and the abnormal temperature is resolved in the battery storage unit 110, the seawater supplied to an inside of the battery storage unit 110 is discharged to the outside of the ship through the overflow discharge line 120 connected to the seawater outlet 115 (S50). Thereafter, the seawater is supplied and discharged inside the battery room 100, and the seawater circulates (S60).

Figure 4:
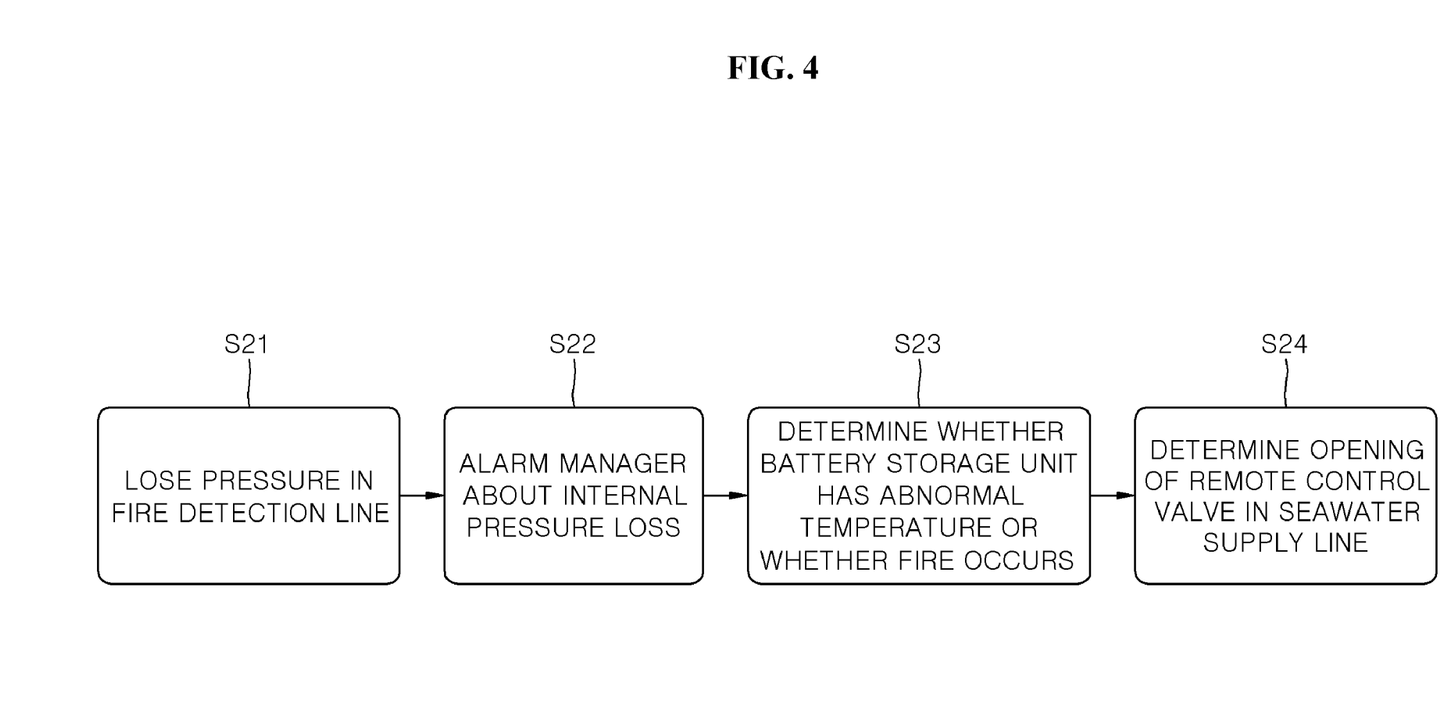
FIG. 4 is a flowchart illustrating a method of detecting a fire and identifying an abnormality in the battery storage unit according to the embodiment of the present disclosure.

FIG. 4 is a flowchart illustrating a method of detecting a fire and identifying abnormality in the battery storage unit according to the embodiment of the present disclosure.

Referring to FIG. 4, in a method of extinguishing the fire and the abnormal temperature, between an operation in which the pressure inside the detection line 250 is lost and the pressure valve 220 of the seawater supply line 320 is opened and an operation in which the seawater is supplied to the battery storage unit 110 and thus is submerged, the manager is notified of a pressure loss inside the detection line 250 (S31), and thereafter, the manager may identify the temperature and thermal imaging information inside the battery storage unit 110 through the thermal imaging camera 240 provided in the battery room 100, and then can determine whether the abnormal temperature or the fire occurs (S32). Thereafter, the manager directly or remotely opens the remote control valve 340 provided in the seawater supply line 320 (S33). After the above process, a process proceeds to a submersion operation S40 of introducing the seawater into the battery storage unit 110. The above processes illustrated in FIG. 4 allow the manager to make a final determination and determine an action related to an emergency situation at the controller 400.

Figure 5:
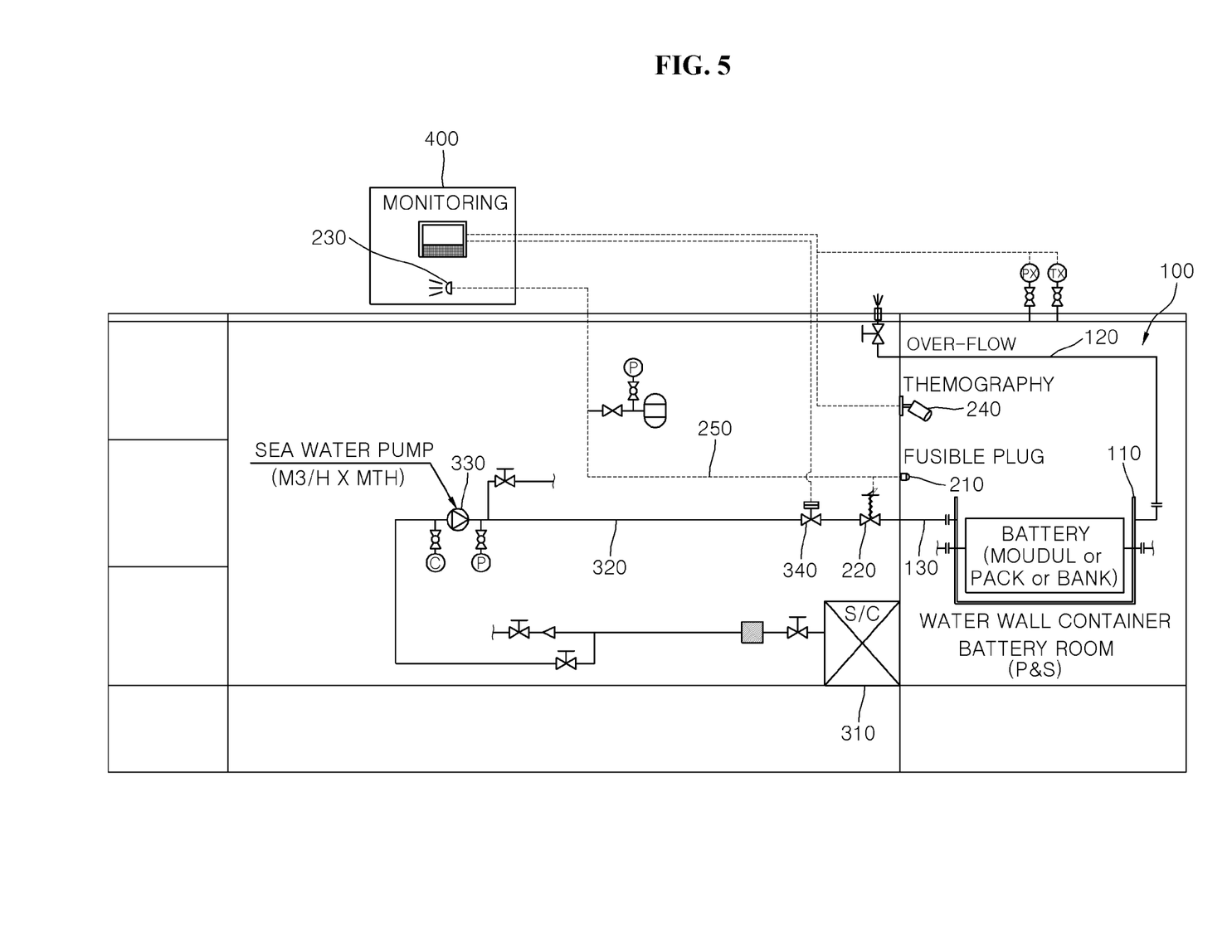
FIG. 5 is a diagram illustrating, with symbols, an overall configuration of the battery pack fire extinguishing device of the battery pack provided with the battery storage unit having an open upper side according to the embodiment of the present disclosure.

FIG. 5 is a diagram illustrating, with symbols, an overall configuration of the battery pack fire extinguishing device of the battery pack provided with the battery storage unit having an open upper side according to the embodiment of the present disclosure.

Referring to FIG. 5, the battery pack fire extinguishing device includes the battery room 100 in which the plurality of battery packs may be stored and which is provided with the battery storage unit 110, the fire detection unit 200 that detects occurrence of the fire inside the battery room 100 and transmits information, the fire extinguishing unit 300 that is provided close to the battery room 100 but outside the battery room 100 and extinguishes the fire by supplying the seawater when the fire detection unit 200 detects the fire, and the controller 400 that may identify information transmitted from the battery room 100, the fire detection unit 200, and the fire extinguishing unit 300 and control the opening or closing of the valve and the input of the seawater.

Figure 6:
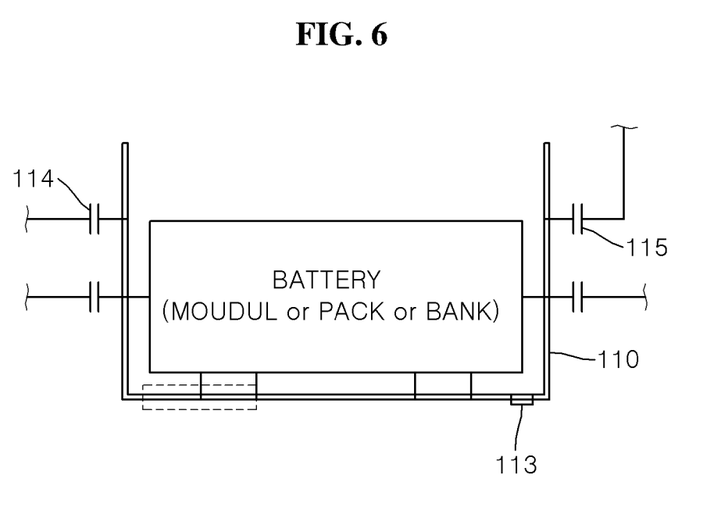
FIG. 6 is a diagram illustrating, in detail, a configuration of the battery storage unit that surrounds the battery pack and has an open upper side according to the embodiment of the present disclosure.

The battery room 100 is provided with the battery storage unit 110 that surrounds the battery pack 10 inside the battery room 100, is provided such that an upper portion thereof is open, and isolates the battery pack 10, and includes the overflow discharge line 120 and the seawater inflow line 130 provided on the one side of the battery storage unit 110.

One end of the overflow discharge line 120 is connected to a seawater outlet 115 of the battery storage unit 110 and the other end thereof is connected to the outside of a ship so that the seawater thereinside may be discharged when the battery storage unit 110 is submerged.

One end of the seawater inflow line 130 may pass through the battery room 100 and may be connected to the seawater inlet 114 of the battery storage unit 110, and the other end thereof may be connected to the seawater supply line 320 of the fire extinguishing unit 300, and the seawater flows into an interior thereof to submerge the battery storage unit 110.

Further, the pressure measuring unit 111 and a temperature measuring unit 112 of the battery room 100 are provided at one end of one side of the battery room 100 and the other end thereof is connected to the controller 400 so that an abnormal pressure and an abnormal temperature that may be identified when the fire occurs in the battery room 100 can be remotely identified through the controller 400.

The fire detection unit 200 is provided with the fusible plug 210 provided inside the battery room, the alarm 230 that may be provided in the controller 400, and the detection line 250 that connects the fusible plug 210 and the alarm 230, the fusible plug 210, the alarm 230, and the detection line 250 being provided in the form of a pipe, and includes the pressure valve 220 provided in the detection line 250 in a closed state and the thermal imaging camera 240 having one end attachably disposed inside the battery room 100 and the other end connected to the controller 400. The fusible plug 210 may be made of a partially fusible synthetic resin material.

When a temperature inside the battery room 100 is greater than a threshold temperature, a portion of the fusible plug 210 made of a fusible synthetic resin material is melted, and thus the pressure inside the detection line 250 is lost. When the pressure inside the detection line 250 is lost, the pressure valve 220 provided in a closed state is opened, and at the same time, an abnormal temperature of the battery room 100 is detected, and thus the alarm 230 of the controller 400 is transmitted to a manager. The manager who receives the alarm can identify a state inside the battery room 100 through the thermal imaging camera 240 and the pressure measuring unit 111 and the temperature measuring unit 112 connected to the outside of the battery room 100 and determine the abnormal temperature and the fire situation.

Figure 9:
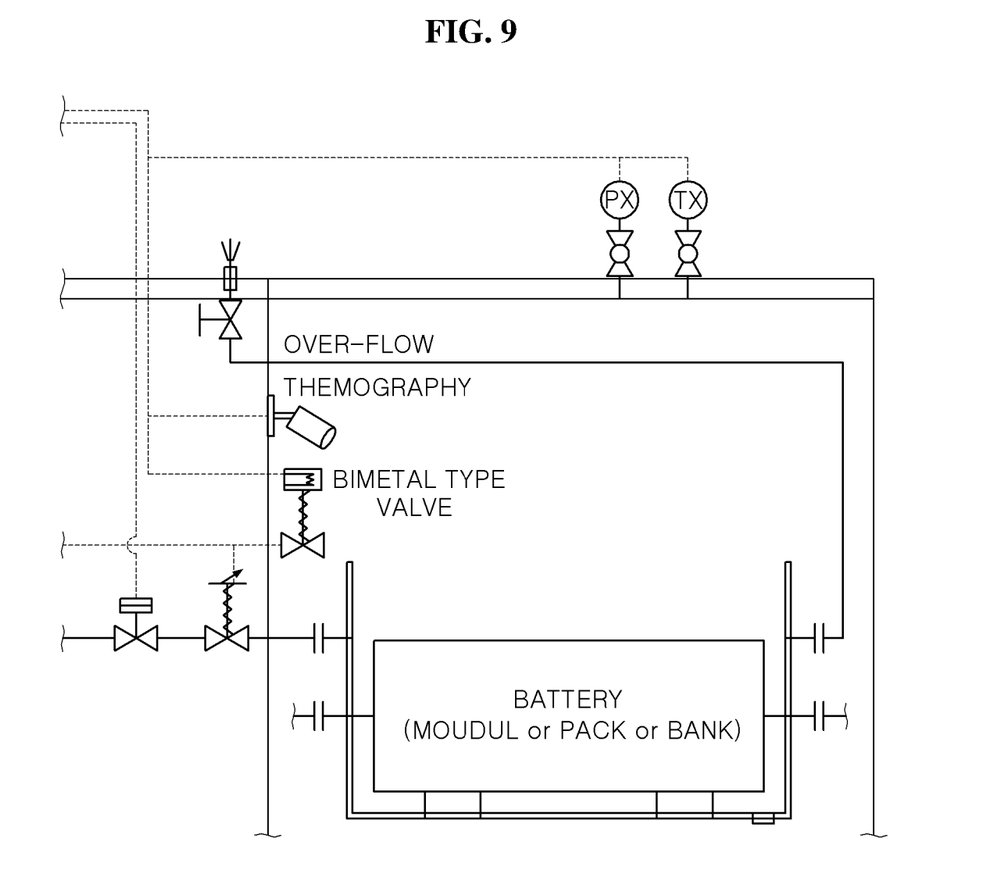
FIG. 9 is a diagram illustrating, with symbols, a case in which a fusible plug is replaced with a bimetal according to the embodiment of the present disclosure.
Figure 10:
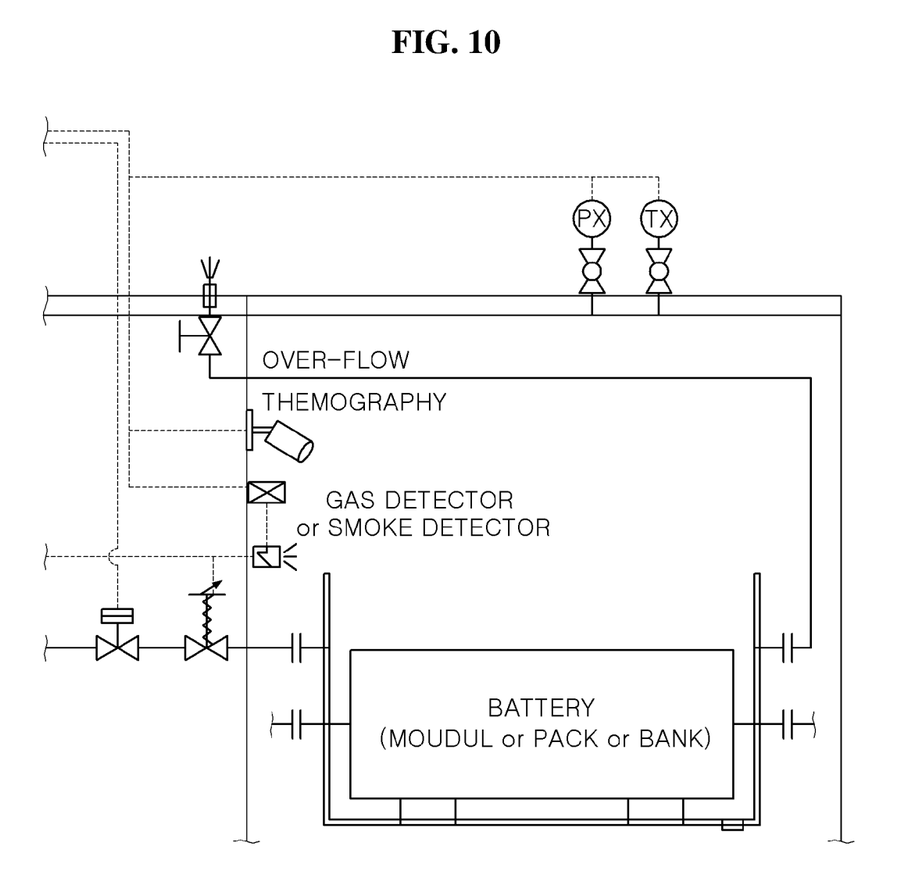
FIG. 10 is a diagram illustrating, with symbols, a case in which the fusible plug is replaced with a platinum filament, a light emitting element, and a light receiving element according to the embodiment of the present disclosure.

FIGS. 9 and 10 are diagrams illustrating a case in which the fusible plug according to the embodiment of the present disclosure is replaced with a photoelectric spot detector including a bimetal, a platinum filament, a light emitting element, and a light receiving element.

Referring to FIGS. 9 and 10, when the fusible plug 210 is replaced with the bimetal, when a temperature of the battery storage unit room is greater than a threshold temperature, the bimetal that blocks the detection line 250 is bent due to heat, the detection line 250 blocked by the bimetal is opened, the internal pressure is lost, the battery storage unit 110 is submerged in the same process when the fusible plug 210 is melted, and thus the abnormal temperature can be resolved and the fire can be extinguished.

When the fusible plug 210 is replaced with the platinum filament, when the fire occurs inside the battery room, the battery pack 10 is burned, and a flammable gas is generated. The flammable gas and the platinum filament react with each other so that the platinum filament is oxidized, and heat is generated due to an oxidation reaction during an oxidation process of the platinum filament. As the platinum filament reacts with a gas having a higher concentration, the platinum filament generates high heat, and when a temperature of the heat generated by the platinum filament is greater than a predetermined temperature, the controller 400 may open the detection line 250 to lose the internal pressure, may submerge the battery storage unit 110 in the same process when the fusible plug 210 is melted, and thus can resolve the abnormal temperature and extinguish the fire.

When the fusible plug 210 is replaced with the photoelectric spot detector, the photoelectric spot detector may include a light emitting element and a light receiving element therein, may be operated in a manner in which light is transmitted from the light emitting element to the light receiving element, and may be operated in two different types such as a photosensitive type that uses blocking of light and a scattered light type that uses scattering of light. In the photosensitive type, the light emitting element and the light receiving element are horizontally spaced a certain distance from each other, and when a fire occurs in the battery room 100, smoke is generated due to combustion of the battery pack 10. Particles inside the generated smoke reduce the amount of light transmitted from the light emitting element to the light receiving element, and the amount of reduced light increases as a smoke concentration increases. When the smoke having a set concentration is generated to block light, the controller 400 may open the detection line 250, the pressure inside the detection line 250 is lost, and then the battery storage unit 110 is submerged in the same process when the fusible plug 210 is melted, and thus the abnormal temperature can be resolved and the fire can be extinguished.

In the scattered light type, the light receiving element is vertically spaced a predetermined distance from the light emitting element, and when the smoke is generated, light generated by the light emitting element is scattered by smoke particles and is input into the light receiving element that is vertically formed. As the concentration increases, the amount of scattered light increases, and when the smoke having a predetermined concentration or higher is generated, the controller 400 may open the detection line 250, the pressure inside the detection line 250 is lost, the battery storage unit 110 is submerged in the same process when the fusible plug 210 is melted, and thus the abnormal temperature can be resolved and the fire can be extinguished.

The fire extinguishing unit 300 is provided with the sea chest 310 having a seawater supply line on one side thereof, the seawater supply line 320, the seawater pump 330, and the remote control valve 340. The sea chest 310 may be positioned adjacent to the battery room 100 and provided with the seawater supply line 320 on one side thereof. The seawater supply line 320 has a pipe shape of which one end passes through one surface of the sea chest 310 and the other end is provided inside the battery room 100 and may deliver the seawater from the sea chest 310 to the battery storage unit 110 when the fire and the abnormal temperature occur. The seawater pump 330 may be provided at a predetermined position of the seawater supply line 320 and move the seawater from the sea chest 310 to the seawater supply line 320 when the fire occurs.

Further, the remote valve 340 may be provided at a predetermined position of the seawater supply line 320, may be connected to the controller 400 so that the manager identifies the fire and the abnormal temperature through the controller 400, and may perform a process of opening the remote valve 340 and delivering the seawater via the seawater inflow line 130 through the seawater inlet 114 to the battery storage unit 110.

After recognizing the fire and the abnormal temperature using the thermal imaging camera 240, the manager may finally open the remote control valve 340 to move the seawater from the sea chest 310 using the seawater pump 330 and thus can extinguish the fire by supplying the seawater to the battery storage unit 110 through the seawater inlet 114 inside the battery storage unit 110 via the seawater inflow line 130 of the battery room 100.

Thereafter, when the fire is extinguished, the remote control valve 340 may be closed to block the supply of the seawater to the battery storage unit 110, and the seawater may be discharged to the outside of the ship through the overflow discharge line 120.

Figure 7:
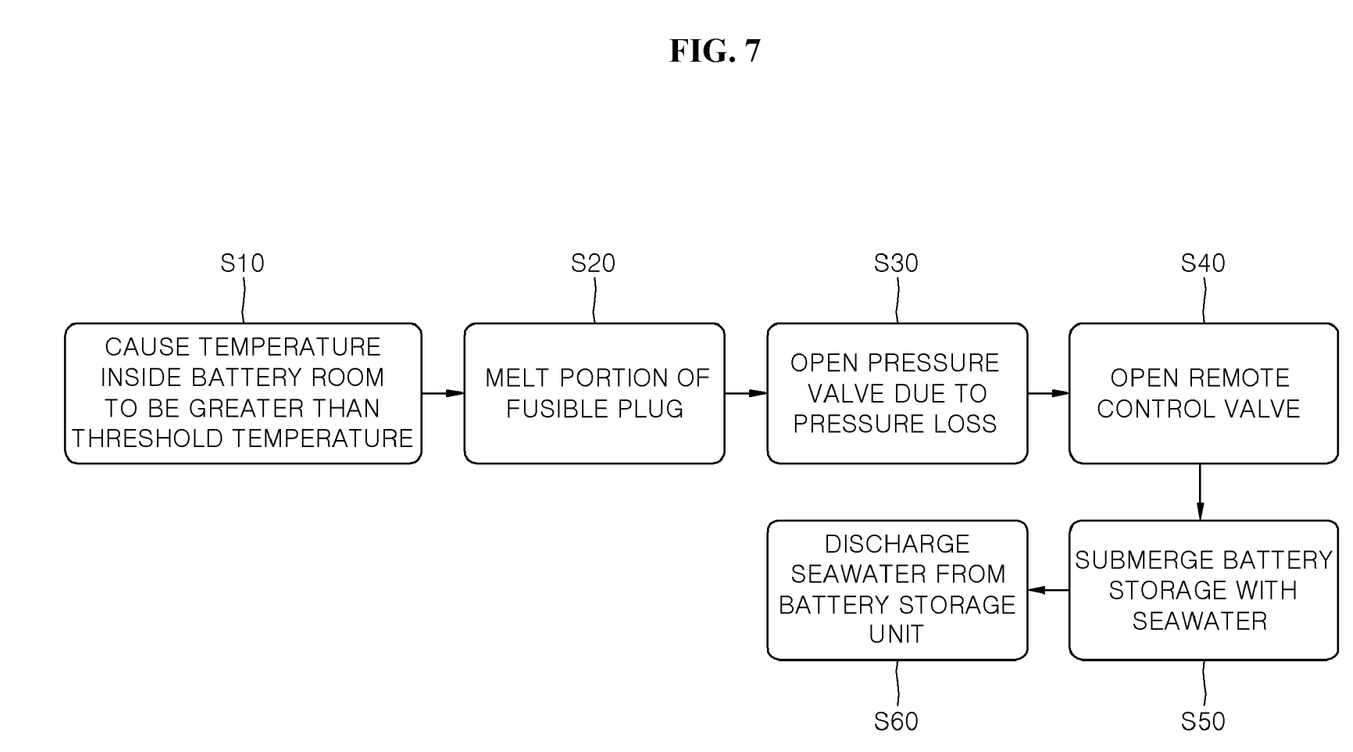
FIG. 7 is a flowchart illustrating the battery pack fire extinguishing method of the battery pack provided with the battery storage unit that surrounds the battery pack and has an open upper side according to the embodiment of the present disclosure.

FIG. 7 is a flowchart illustrating the battery pack fire extinguishing method of the battery pack provided with the battery storage unit that surrounds the battery pack and has an open upper side according to the embodiment of the present disclosure.

Referring to FIG. 7, when a temperature inside the battery room 100 is greater than a threshold temperature, a portion of the fusible plug 210 is melted (S20). As the portion of the fusible plug 210 is melted, the pressure inside the detection line 250 is lost, the pressure valve 220 connected to the detection line 250 and the seawater supply line 320 is opened (S30). The pressure valve 220 is opened, the seawater suctioned from the seawater inlet 114 passes through the seawater supply line 320 and is supplied to the battery storage unit 110, then the battery storage unit 110 is submerged, and thus the fire is extinguished and the abnormal temperature is resolved (S40). When the fire is extinguished and the abnormal temperature is resolved in the battery storage unit 110, the seawater supplied to the inside of the battery storage unit 110 is discharged to the outside of the ship through the overflow discharge line 120 connected to the seawater outlet 115 (S50). Thereafter, the seawater is supplied and discharged inside the battery room 100, and the seawater circulates (S60).

Figure 8:
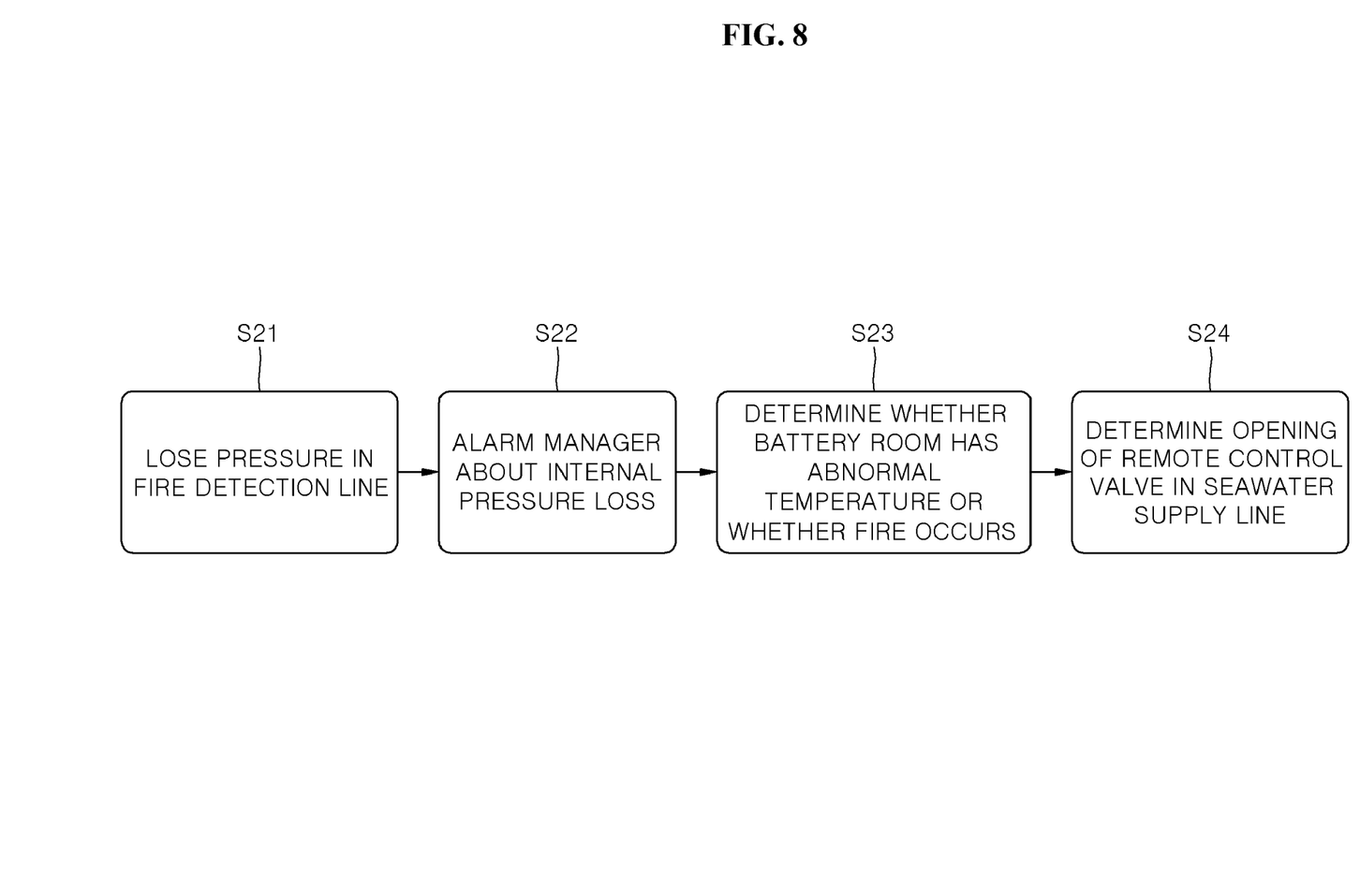
FIG. 8 is a flowchart illustrating a method of detecting a fire and identifying an abnormality in a battery room according to the embodiment of the present disclosure.

FIG. 8 is a flowchart illustrating a method of detecting a fire and identifying abnormality in a battery room according to the embodiment of the present disclosure.

Referring to FIG. 8, in a method of extinguishing the fire and the abnormal temperature, between an operation in which the pressure inside the detection line 250 is lost and the pressure valve 220 of the seawater supply line 320 is opened and an operation in which the seawater is supplied to the battery storage unit 110 and thus is submerged, the manager is notified of a pressure loss inside the detection line 250 (S31), and thereafter, the manager may identify the temperature and thermal imaging information inside the battery storage unit 110 through the thermal imaging camera 240 provided in the battery room 100, and then can determine whether the abnormal temperature or the fire occurs (S32). Thereafter, the manager directly or remotely opens the remote control valve 340 provided in the seawater supply line 320 (S33). After the above process, a process proceeds to a submersion operation S40 of introducing the seawater into the battery storage unit 110. The above processes illustrated in FIG. 4 allow the manager to make a final determination and determine an action related to an emergency situation at the controller 400.

According to the present disclosure, a ship battery pack fire extinguishing device may be provided in which a battery storage unit that may isolate a battery pack is provided inside a battery room, and when a fire occurs, seawater is input into the battery storage unit, the battery pack is submerged, the battery is safely extinguished in the seawater even when the fire occurring in a battery is not extinguished by the seawater, complete burning of the entire ship is prevented, and thus economic efficiency can increase.

Further, according to the present disclosure, a ship battery pack fire extinguishing device may be provided which safely extinguishes a fire in a battery cell, which is previously difficult to extinguish, until the fire is completely extinguished, and thus can ensure the safety of passengers on board.

Although the disclosure has been described with specific details such as specific components, limited embodiments, and drawings, these are provided merely to help with the general understanding of the present disclosure, and the present disclosure is not limited to the embodiments. Further, those skilled in the art to which the present disclosure pertains may make various modifications and changes based on this description.

Thus, the spirit of the present disclosure should not be limited to the above-described embodiments, and the following appended claims as well as all modifications being equal or equivalent to the appended claims belong to the scope of the present disclosure.

What is claimed is:

1. A device for extinguishing a fire in a battery pack for a ship, the device comprising:

a battery room in which a plurality of battery packs are stored and which is provided with a battery storage unit;

a fire detection unit provided with a fusible plug attachably disposed inside the battery room and having a portion to be melted to lose a pressure inside a detection line when a temperature of the battery room is greater than a threshold and configured to detect an abnormal temperature inside the battery room and transmit information on the abnormal temperature; and a fire extinguishing unit provided outside the battery room and configured to extinguish a fire by supplying seawater when the fire detection unit detects the fire, wherein the battery room, in which the plurality of battery packs are stored, includes:

the battery storage unit provided inside the battery room to surround the plurality of battery packs and having an open upper portion to isolate a battery;

an overflow discharge line which is provided on one side of the battery storage unit, of which one end is connected to the battery storage unit and the other end is connected to an outside of a ship, and which opens a valve when the battery storage unit is submerged to discharge inside seawater to an outside; and a seawater inflow line of which one end passes through the battery room and is connected to a seawater inlet of the battery storage unit and the other end is connected to a seawater supply line of the fire extinguishing unit and which causes seawater to flow into the battery storage unit to submerge the battery storage unit, the fire detection unit includes:

a pressure valve connected to a predetermined position of the detection line, provided in the seawater supply line in a closed state, and opened due to pressure loss when the fusible plug is damaged.

2. The device of claim 1, wherein the battery storage unit further includes:

an outlet through which remaining seawater of the battery storage unit is discharged;

the seawater inlet which is provided to pass through a side surface of the battery room and connected to the seawater inflow line and through which the seawater is introduced; and a seawater outlet which is connected to the overflow discharge line and through which the seawater is discharged.

3. The device of claim 1, wherein the fire detection unit includes:

an alarm provided at a distal end of the detection line and configured to generate noise when the pressure inside the detection line is lost;

a thermal imaging camera positioned inside the battery room and configured to identify a situation inside the battery room through an image; and the detection line provided in a pipe shape of which one end is attached to the fusible plug and the other end is connected to the alarm and provided with a compressed interior.

4. The device of claim 1, wherein the fire extinguishing unit includes:

the seawater inlet positioned adjacent to the battery room and having the seawater supply line on one side thereof;

the seawater supply line having one end passing through one surface of a seawater tank and the other end passing through an inside of the battery room or one surface of the battery room and configured to supply the seawater from the seawater inlet to the battery storage unit;

a seawater pump provided at a predetermined position of the seawater supply line and configured to move the seawater from the seawater inlet to the seawater supply line; and a remote control valve provided at a predetermined position of the seawater supply line and opened to move the seawater to the battery storage unit when a fire occurs.

5. The device of claim 1, further comprising:

a controller configured to allow a manager to control opening and closing of a valve connected to the battery storage unit and input of the seawater by receiving information on a temperature and a pressure of the battery room, an alarm transmitted from the fire detection unit when a pressure inside the detection line decreases, and information on an image inside the battery room.

* * * * *

UNITED STATES PATENT AND TRADEMARK OFFICE
CERTIFICATE OF CORRECTION

| | | |
|---|---|---|
| PATENT NO. | : 12,115,399 B2 | Page 1 of 1 |
| APPLICATION NO. | : 18/525761 | |
| DATED | : October 15, 2024 | |
| INVENTOR(S) | : Sung Beom Lee | |

It is certified that error appears in the above-identified patent and that said Letters Patent is hereby corrected as shown below:

On the Title Page

Item (54): "DEVICE AND METHOD FOR EXTINGUISHING FIRE IN BATTERY PACK FOR SHIP PRELIMINARY CLASS" should be changed to --DEVICE AND METHOD FOR EXTINGUISHING FIRE IN BATTERY PACK FOR SHIP--

In the Specification

Column 1, Line 1: "DEVICE AND METHOD FOR EXTINGUISHING FIRE IN BATTERY PACK FOR SHIP PRELIMINARY CLASS" should be changed to --DEVICE AND METHOD FOR EXTINGUISHING FIRE IN BATTERY PACK FOR SHIP--

Signed and Sealed this
Twenty-sixth Day of November, 2024

Katherine Kelly Vidal
*Director of the United States Patent and Trademark Office*